2,792,307
Patented May 14, 1957

2,792,307

STABILIZATION OF ORGANIC COMPOUNDS

Joseph A. Chenicek, Bensenville, Ill., assignor to Universal Oil Products Company, Des Plaines, Ill., a corporation of Delaware No Drawing. Application July 29, 1953,
Serial No. 369,220

13 Claims. (Cl. 99—163)

This invention relates to the stabilization of organic compounds which tend to deteriorate in storage or in use due to oxidation or other reactions.

The novel method of the present invention may be utilized for the stabilization of various organic materials which are subject to oxidative deterioration and include motor fuel, particularly unsaturated gasolines as, for example, cracked gasoline and polymer gasoline, jet fuel, diesel oil, mineral oil, lubricating oil, fuel oil, drying oil, greases, rubber, monomers including styrene, butadiene, etc., paraffin waxes, edible fats and oils, forage groups, etc. These materials are adversely affected by oxygen, with the resultant formation of undesirable gum, discoloration, rancidity or other deleterious reactions.

The invention is particularly applicable to the stabilization of fatty materials including edible fats and oils which may be of animal, vegetable or mineral origin and which tend to become rancid, especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as the hydrogenated oils. It is understood that other oils and fats may be treated within the scope of the present invention, including oils and fats which have previously been subjected to various treatments, such as blowing with air, heat treatment, etc.

In one embodiment the present invention relates to a method of stabilizing an organic substance subject to oxidative deterioration which comprises adding thereto a β-alkylthio amide.

In a specific embodiment the present invention relates to a method of stabilizing a fatty material which comprises adding thereto from about 0.0001% to about 1% by weight of N,N' - methylene-bis - β - ethylthiopropion amide.

The additives of the present invention comprises new compounds and, therefore, another embodiment of the invention comprises these compounds as novel compositions of matter.

The β-alkylthio amides for use in accordance of the present invention may be represented by the following general formula:

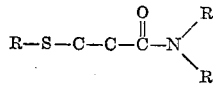

where R is selected from hydrogen, hydrocarbon and substituted hydrocarbon groups, the various R radicals being the same or different, and the hydrogen atoms, not illustrated, may be replaced by hydrocarbon and/or substituted hydrocarbon groups.

From the above general formula, it will be noted that the novel additive of the present invention contains a sulfur atom β to the carbonyl group, to which carbonyl group also is attached a nitrogen atom. These compounds are readily prepared by the reaction of the desired acrylamide compound with a suitable sulfur compound. The acrylamide compounds include acrylamide, α - methylacrylamide, α - ethylacrylamide, α-propylacrylamide, α-butylacrylamide, α-amylacrylamide, α-hexylacrylamide, etc., β-methylacrylamide (crotylamide and isocrotyl amide), β-ethylacrylamide, β-propylacrylamide, β-butylacrylamide, β-amylacrylamide, β-hexylacrylamide, etc., N-methylacrylamide, N-ethylacrylamide, N-propylacrylamide, N - butylacrylamide, N - tertiary - butylacrylamide, N-amylacrylamide, N-hexylacrylamide, etc., N,N'-methylene-bis-acrylamide, N,N'-ethylene-bis-acrylamide, N,N'-propylene-bis-acrylamide, N,N'-butylene-bis-acrylamide, N,N'-amylene-bis-acrylamide, etc., N,N'-alkylene-bis-acrylamides having hydrocarbon substituents attached in the α and/or β positions including, for example, N,N'-methylene - bis - α - methylacrylamide, N,N' - ethylene-bis - α - ethylacrylamide, etc. Other acrylamide compounds include: N,N'-ethylidene-bis-acrylamide, N,N'-propylidene - bis - acrylamide, N,N' - isopropylidene - bis-acrylamide, N,N' - butylidene - bis - acrylamide, N,N'-cyclohexylidene - bis - acrylamide, etc., and N,N' - alkylidene-bis-acrylamides having substituents in the α or β positions.

Any suitable mercaptan may be utilized in the preparation of these materials. Primary lower mercaptans are preferred, including methyl mercaptan, ethyl mercaptan, propyl mercaptan and butyl mercaptan, although higher molecular weight mercaptans containing up to 12 or more carbon atoms may be employed. In general, the primary mercaptans are more reactive than the secondary mercaptans, including isopropyl mercaptan, secondary butyl mercaptan, secondary amyl mercaptan, etc., which in turn are more reactive than the tertiary mercaptans, including tertiarybutyl mercaptan, tertiaryamyl mercaptan, tertiaryhexyl mercaptan, etc. While the alkyl mercaptans are preferred, it is understood that any suitable mercapto compound may be employed. Other sulfur compounds include hydrogen sulfide, aromatic mercaptans including thiophenols, thiocresols and particularly p-thiocresols, thiohydroquinone, mercaptobenzothiazole, etc.

It is apparent that numerous compounds may be prepared and utilized in accordance with the present invention. However, all these compounds will not necessarily be equivalent and may be of different effectiveness in different substrates.

As hereinbefore set forth, the particular additive will depend upon the reactants used in preparing the same. For example, the reaction of ethyl mercaptan with acrylamide produces β-ethylthiopropionamide, the reaction of $H_2S$ with acrylamide will produce β-mercaptopropionamide, the reaction of ethyl mercaptan with N-tertiarybutyl acrylamide will produce β-ethylthio-N-tertiarybutyl propionamide, etc. Specific compounds herein set forth are intended as typical representative compounds but not with the intention of unduly limiting the broad scope of the present invention to these compounds. Specific compounds include β-propylthiopropionamide, β-butylthiopropionamide, β-amylthiopropionamide, etc., β-phenylthiopropionamide, β-tolylthiopropionamide, β-xylylthiopropionamide, etc., β-ethylthio-N-methylpropionamide, β-ethylthio-N-ethylpropionamide, β-ethylthio-N-propylpropionamide, β-ethylthio-N-butylpropionamide, etc., β-propylthio-N-tertiarybutylpropionamide, β-butylthio-N-tertiarybutylpropionamide, etc., β-phenylthio-N-tertiarybutylpropionamide, β-tolylthio - N - tertiarybutylpropionamide, β-xylylthio-N-tertiarybutylpropionamide, etc., β-ethylthiobutyramide, β-propylthiobutyramide, β-butylthiobutyramide, β-amylthiobutyramide, etc., β-phenylthiobutyramide, β-tolylthiobutyramide, β-xylylthiobutyramide, etc., β-ethylthiovaleramide, β-propylthiovaleramide, β-butylthiovaleramide, β-amylthiovaleramide, etc., β-phenylthiovaleramide, β-tolylthiovaleramide, β-xylylthiovaleramide, etc.

In the general formula hereinbefore set forth, one or both of the R radicals attached to the nitrogen atom may be a substituted hydrocarbon group. In a preferred embodiment, this group comprises an alkyl group substituted with an

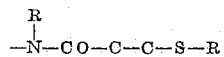

radical and the additive thus may comprise compounds as N,N'-methylene-bis-β-ethylthiopropionamide, N,N'-methylene-bis-β-propylthiopropionamide, N,N'-methylene-bis-β-butylthiopropionamide, etc., N,N'-ethylene-bis-β-ethylthiopropionamide, N,N'-ethylene-bis-β-propylthiopropionamide, N,N'-ethylene-bis-β-butylthiopropionamide, etc., N,N'-ethylidene-bis-β-ethylthiopropionamide, N,N'-isopropylidene-bis-β-ethylthiopropionamide, etc.

The reaction of the acrylamide and sulfur compounds may be effected in any suitable manner. In one method, a suspension of acrylamide in dioxane, methanol or other suitable solvent is prepared, and the required equivalent of sulfur compound is added, together with a catalytic amount of a suitable basic material including, for example, sodium methylate, piperidine, etc. When the mono-alkylthio compound is desired, one equivalent of sulfur compound is utilized. When the di-alkylthio compound is desired, two equivalents of the sulfur compound are employed with an N,N'-alkylene or alkylidene-bis-acrylamide. After the reaction has been completed, the solvent may be evaporated and the product recovered in any suitable manner, which may depend upon whether it is a solid or liquid. The solid may be recovered by recrystallizing from a suitable solvent as, for example, hydrocarbon, alcohol, etc.

The additive of the present invention generally is incorporated in the organic material to be stabilized in an amount of less than about 1% by weight and preferably in an amount of from about 0.0001% to about 1% by weight. When used in edible fats and oils, the additive generally will be employed in an amount of from about 0.001% to about 0.5% by weight. When used in gasoline, the additive will generally be used in amounts above about 0.002% by weight. The additive may be used alone or in conjunction with synergists, inhibitor activators, dyes, antiknock agents, etc., depending upon the material to be stabilized. For example, when used in edible fats and oils, a synergist, such as phosphoric acid, ascorbic acid, citric acid, etc., generally will be used along with the additive, the synergist usually being added in an amount within the range of from about 0.0001% to about 0.5% by weight. When used in gasoline, lead tetraethyl, a dye and perhaps an inhibitor activator, such as certain types of alkylene polyamines, may be used. It was understood that the additive may be used along with other astioxidants, as well as metal deactivators, etc.

The following examples are introduced to illustrate further the novelty and utility of the present invention, but not with the intention of unduly limiting the same.

Example I

β-Ethylthiopropionamide was prepared as follows: To a suspension of acrylamide in dioxane were added one equivalent of ethyl mercaptan and a catalytic amount of sodium methylate. The temperature rose rapidly. After the reaction was completed, the solvent was evaporated and the product recrystallized from a hydrocarbon mixture. The product is a solid, white crystal, melting point of 65 to 66° C. The compound has the empirical formula of $C_5H_{11}ONS$. The percent sulfur by calculation is 24.0% and the percent sulfur by analysis is 23.8%.

The β-ethylthiopropionamide, prepared in the above manner, was utilized in a concentration of 0.02% for the stabilization of lard which, without inhibitor, had a stability period of 5 hours as determined by the "Swift" test, also referred to as the A. O. M. (Active Oxygen Method). The test is described in detail in the article by A. E. King, H. L. Roschen and W. H. Irwin, which appeared in the Oil and Soap, vol. X, No. 6, pages 105–109 (1933), and modified as described in the article by R. W. Reimenschneider, J. Turer and R. M. Spec, which appeared in the Oil and Soap, pages 169–171, September 1943. In general, this test comprises bubbling air through a sample of the lard and rancidity is determined organoleptically and by peroxide values. The results of these tests are reported as A. O. M. stability period, which is the number of hours required to reach a peroxide number of 20.

0.02% by weight of β-ethylpropionamide increased the stability period of the lard from 5 hours to 38.5 hours.

Example II

β-Ethylthio-N-tertiarybutylpropionamide was prepared in substantially the same manner as described in Example I except that N-tertiarybutyl acrylamide was utilized. The product is a liquid having a boiling point of 102–104° C./0.6 mm. The product has an empirical formula of $C_{19}H_{19}ONS$. The calculated percent of sulfur is 16.9% and the amount of sulfur determined by analysis is 16.5%.

When added to another sample of lard described in Example I, 0.02% by weight of β-ethylthio-N-tertiarybutylpropionamide increased the stability of the lard to 38.5 hours.

Example III

N,N'-methylene-bis-β-ethylthiopropionamide was prepared as follows: To a suspension of N,N'-methylene-bis-acrylamide in methanol were added two equivalents of ethyl mercaptan and a catalytic amount of piperidine. The mixture was warmed to 30° C. and stirred until all of the amide went into solution. The product was cooled, filtered and recrystallized from methanol. The product is a solid, white crystals, having a melting point of 176–178° C. and an empirical formula of $C_{11}H_{22}O_2N_2S_2$.

0.02% by weight of the N,N'-methylene-bis-β-ethylthiopropionamide, prepared in the above manner, was incorporated in another sample of the lard described in Example I and served to increase the stability period of the lard from 5 hours to 77 hours.

Example IV 0.04% by weight of N,N'-methylene-bis-β-ethylthiopropionamide, as prepared in the above manner, may be incorporated in cracked gasoline having an induction period without inhibitor of about 100 minutes. This will serve to considerably increase the induction period of the gasoline.

Example V

β-Ethylthio-α-methylpropionamide may be utilized in a concentration of 0.01% by weight to stabilize styrene. The effectiveness of the additive may be determined in the following manner. A sample of styrene and another sample of the styrene containing the additive are each sealed in separate small glass tubes having long, thin necks. The tubes may be heated at 80° C. for 10 hours or at a higher temperature and/or for a longer period of time if required. Periodically the tubes are inverted, and the change in viscosity is determined by observing "bubble time": that is, the time necessary for a bubble to rise to the top of the thin neck when the tube is inverted at 25° C. Increase in viscosity indicates deterioration of the sample caused by oxidation, gum formation, polymerization, etc.

Example VI

This example relates to the use of an additive of the present invention in the stabilization of rubber. 0.5% by weight of N,N'-methylene-bis-β-propylthiopropionamide is added to the latex resulting from the emulsion polymerization of butadiene and styrene, after which the latex is coagulated and dried. The rubber so produced will be improved as to retention of color, strength, elasticity, etc.

I claim as my invention:

1. Fatty material subject to oxidative deterioration containing, as a retardant of said deterioration, a stabilizing amount of a β-alkylthioamide having at least 2 carbon atoms in straight chain arrangement with the carbon atom of a carbonyl group, a sulfur atom on the carbon atom beta to the carbonyl group and a nitrogen atom attached to the carbon atom of the carbonyl group.

2. Fatty material subject to oxidative deterioration containing from about 0.0001% to about 1% by weight of a β-alkylthio-N-alkylpropionamide having a sulfur atom on the carbon atom beta to the carbonyl group.

3. Fatty material subject to oxidative deterioration containing from about 0.0001% to about 1% by weight of a N,N'-alkylene-bis-β-alkylthiopropionamide having a sulfur atom on the carbon atom beta to the carbonyl group.

4. Fatty material subject to oxidative deterioration containing from about 0.0001% to about 1% by weight of a β-alkylthiobutyramide having a sulfur atom on the carbon atom beta to the carbonyl group.

5. Fatty material subject to oxidative deterioration containing from about 0.0001% to about 1% by weight of a β-alkylthiovaleramide having a sulfur atom on the carbon atom beta to the carbonyl group.

6. Lard containing, in an amount sufficient to retard rancidity, a β-alkylthioamide having at least 2 carbon atoms in straight chain arrangement with the carbon atom of a carbonyl group, a sulfur atom on the carbon atom beta to the carbonyl group and a nitrogen atom attached to the carbon atom of the carbonyl group.

7. A method of stabilizing a fatty material subject to oxidative deterioration which comprises incorporating therein a stabilizing amount of a β-alkylthioamide having at least 2 carbon atoms in straight chain arrangement with the carbon atom of a carbonyl group, a sulfur atom on the carbon atom beta to the carbonyl group and a nitrogen atom attached to the carbon atom of the carbonyl group.

8. Fatty material subject to oxidative deterioration containing from about 0.0001% to about 1% by weight of β-ethylthiopropionamide.

9. Fatty material subject to oxidative deterioration containing from about 0.0001% to about 1% by weight of β-ethylthio-N-tertiarybutyl propionamide.

10. Fatty material subject to oxidative deterioration containing from about 0.0001% to about 1% by weight of N,N'-methylene-bis-β-ethylthiopropionamide.

11. Fatty material subject to oxidative deterioration containing from about 0.0001% to about 1% by weight of β-ethylthiobutyramide.

12. Fatty material subject to oxidative deterioration containing from about 0.0001% to about 1% by weight of β-ethylthiovaleramide.

13. Lard tending to become rancid containing from about 0.0001% to about 1% by weight of β-ethylthiopropionamide.

References Cited in the file of this patent

UNITED STATES PATENTS

| | | |
|---|---|---|
| 2,184,495 | Graenacher et al. | Dec. 26, 1939 |
| 2,336,928 | Denny | Dec. 14, 1943 |
| 2,456,991 | Prill | Dec. 21, 1948 |
| 2,535,875 | Stewart | Dec. 26, 1950 |
| 2,563,835 | Gribbens et al. | Aug. 14, 1951 |
| 2,602,816 | Gregory et al. | July 8, 1952 |